July 18, 1961 J. H. SPENCER 2,992,480
METHOD FOR BONDING LAMINATIONS
Filed Dec. 14, 1956
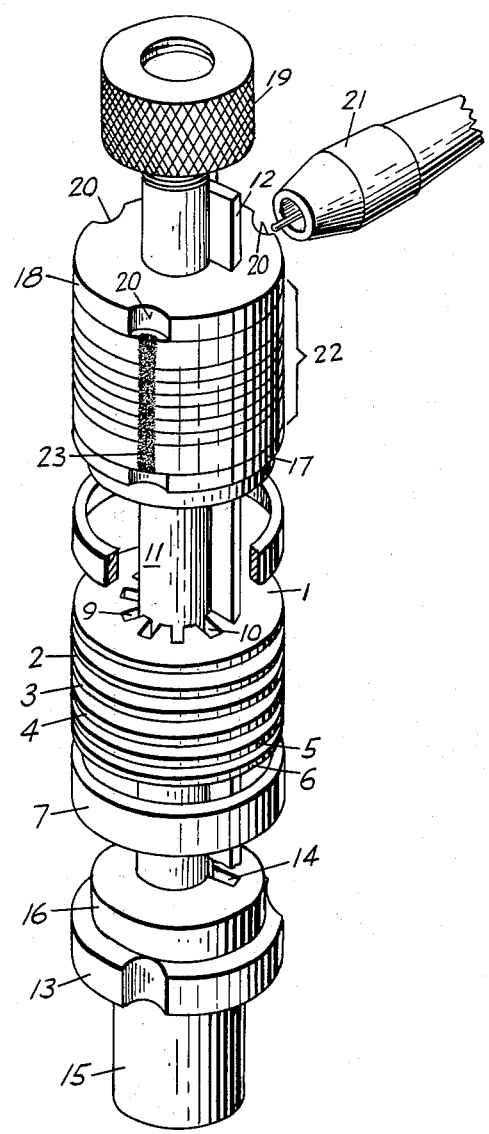
INVENTOR
JAMES H. SPENCER
BY Elmer J. Gorn
ATTORNEY

United States Patent Office 2,992,480
Patented July 18, 1961

2,992,480
METHOD FOR BONDING LAMINATIONS
James H. Spencer, Wayland, Mass., assignor to Raytheon Company, a corporation of Delaware
Filed Dec. 14, 1956, Ser. No. 628,269
5 Claims. (Cl. 29—472.3)

This invention relates to a method for bonding metallic laminates, and more particularly to a manufacturing method for producing metallic laminar structures unified by brazing which completely eliminates the use of fixtures and pressure-producing apparatus during the brazing operation.

Prior methods of uniting laminations by brazing with a hard (i.e. high-temperature) solder have relied upon fixtures to maintain the laminae in a desired relationship during the heating cycle, particularly where the alignment of the laminae is critical, such as in the manufacture of magnetron anodes described in U.S. Patent No. 2,458,802 (col. 3, line 41 et seq.). Precise alignment fixtures are expensive to construct, and it was found that those fixtures were rendered unusuable because of deformation after repeated heating in the brazing furnace or because after repeated use, solder adhered to the fixture so that it became difficult to remove the brazed work. To further complicate matters, it was necessary under the former practice to compress the laminae during the brazing operation to insure good surface contact at the time the solder was molten. This required apparatus for producing pressure upon the laminae during the heating period.

The invention disclosed here has eliminated the need for having fixtures accompany precisely-aligned laminae through the heating operation, thereby immensely increasing the life of those fixtures, and, in addition, the invention has eliminated the need for apparatus to compress the laminae during brazing. The efficient and economic production of precision laminated articles has been greatly advanced by my novel method.

The invention will be described with relation to the manufacture of the laminated magetron anode. This example has been selected because it illustrates the method applied to an article requiring (1) a vacuum-tight, mechanically strong bond between laminae, (2) precise alignment of the laminae, and (3) precise dimensional control so that the laminar anode after brazing will have the required dimensions without necessitating additional machining operations.

The present invention contemplates stacking laminae in a fixture having means for aligning the laminae, tack welding the periphery of the laminated stack at widely-spaced intervals, removing the weldment from the fixture, and heating the stack to brazing temperature in a furnace having the customary neutral or reducing atmosphere. Experience has amply shown that tack welds maintain the laminae in precise alignment during the heating cycle, removing the necessity for brazing the laminae while they are on an alignment fixture. In addition, tack welding the laminae insures that the dimensions of the laminated stack after brazing will be identical with the dimensions of the stack before heating in the furnace, because the welds maintain the spatial relationship between laminae.

At better understanding of the invention may be had by reference to the exposition following and the accompanying drawing which depicts a fixture on which are assembled laminated magnetron anodes. Each magnetron anode is constructed of a plurality of similar flat metallic laminae, exemplified by stampings 1 to 6, disposed between a lower end ring 7 and an upper end ring 8. Each lamina or stamping is formed with a central opening having a circular crenelated form defining vanes 9 and radial slots 10. The dies for fabricating the stampings are very accurately constructed and are hardened so that large numbers of stampings may be struck from thin sheets of metal while maintaining high dimensional precision. The metal employed in these stampings and in end rings 7 and 8 is preferably an oxygen-free, high-conductivity copper. The dimensions of the central opening and of the slots 10 are critical. The stampings, after being formed by the dies, are cleaned, for example by anodic pickling, to rid their surfaces of grease and other contaminants. In addition, the stampings may be treated by conventional processes to remove surface oxides which may have formed. Each of the stampings is plated with silver so that a coat is formed having a thickness of the order of .002" to .004". The stampings are preferably electroplated because of the pure silver uniform covering which is obtained and the ease with which the depth of the coat may be controlled. To avoid thin tarnish films on the silver-plated surface, immediately after plating the stampings are rinsed in hot water, dipped in clean alcohol, and dried in hot air. Lower end ring 7 and upper end ring 8 are cleaned and plated with silver in the same manner as the stampings 1 to 6.

The components of the magnetron anode are assembled upon an arbor 11 equipped with a key or spline 12. A bottom plug 13 having a keyway 14 engaging the spline 12 is slidiably mounted on arbor 11, and the arbor is formed with an enlarged portion 15 providing a ledge on which rests the bottom plug 13. In order to locate lower end ring 7, the bottom plug 13 is formed with a reduced portion defining a shoulder 16 about which fits the ring 7. The laminae 1 to 6 surmount lower end ring 7 and are maintained in alignment upon the arbor 11 by spline 12 which fits closely into one of the radial slots 10 of each lamina. Upper end ring 8 (shown partly broken away) is disposed above lamina 1 and is properly positioned by an intermediate spacer 17 provided with upper and lower locating shoulders similar to shoulder 16. A number of such magnetron anodes may be assembled on one arbor, each anode assemblage being separated from the preceding assemblage by an intermediate spacer typified by the spacer 17. The uppermost assemblage is surmounted by a top plug 18 which is an inverted version of plug 13. The upper end of arbor 11 is provided with threads which engage the internal threads of knurled cap 19, permitting the cap to be screwed downwardly to compress all the anode assemblages and thererby bring together the surfaces of the laminae. In practice, it has been found that after being formed by the dies the stampings are nearly flat so that a large compressive force is unnecessary, and the cap 19 is normally tightened manually.

The plugs 13, 18, and spacer 17 are each provided with three peripheral notches at 120° intervals, the notches 20 in plug 18 being exemplars, and the spacers and plugs are keyed to the arbor by spline 12 so that three sets of vertically aligned notches are formed. A welding torch 21, positioned adjacent one of the peripheral notches 20 in top plug 18, is moved vertically downward so that a weld of the base metal is formed, joining the assemblage along a narrow vertical peripheral area. A shielded electric arc employing an inert gas such as argon or helium to mask the weld has produced excellent results. The peripheral notches in spaces 13, 17 and 18 are of sufficient depth to prevent the anode assemblages from being welded to the spacer. In addition, electric switches (not shown) are arranged to extinguish the welding arc during the time the torch traverses a notch and to relight the arc at the next assemblage. Arbor 11 is secured to a stable base, such as a workbench, in a manner permitting the arbor to be rotated. As a refinement, indexing means may be employed to lock the arbor after each 120° of rotation to automatically and sequentially bring the notches in each of the spacers into register with the welding torch 21.

An anode assembly 22 is illustrated in the drawing in which a vertical peripheral weld 23 has been formed. It is to be understood that a number of such welds are made at spaced locations; in the instant case, three welds are spaced at 120° intervals. The welds are formed so rapidly that only the silver plate and base metal in the immediate vicinity of the arc are melted. Where the silver plate tends to melt at other places, a hollow water-cooled arbor may be employed to correct that tendency. The quality of the weld can be improved by removing the silver plate in the vicinity of the weld area prior to forming the weld.

After tack welding the anode assemblies, cap 19 is unscrewed and the anodes are removed. A brazing furnace having a reducing atmosphere, such as hydrogen, or having a neutral atmosphere, is now employed. The anodes are placed in the brazing furnace and heated to about 800° C. causing the silver plate to alloy with the copper and form a bond between the laminae. The anodes are retained in the brazing furnace sufficiently long to insure the entire anode mass being raised to brazing temperature.

It has been observed that some silver solder exudes from the interlaminar spaces during the brazing operation. The solder exudate is due to the difference between the coefficient of thermal expansion of copper as compared to the thermal expansion coefficient of silver. Since silver has the larger thermal expansion coefficient it expands at a faster rate than copper. Therefore, when the anode assembly is heated in the brazing furnace, the silver plate expands so that pressure is induced between the laminae because the copper welds expand at a lower rate. The pressure induced by that action aids the diffusion of the silver into the copper and hence promotes the formation of an effective bond without requiring external apparatus to compress the laminae. The amount of solder exudate can be controlled to some extent by regulating the depth of the silver plate applied to the laminae. However, the exudate cannot be entirely eliminated in this manner since an effective and vacuum-tight bond will not be formed where the silver plate is radically diminished. The exuded solder, by virtue of gravity flow, collects at the lowest point of the anode assembly, and the solidified exudate may later be removed by any appropriate means. The heated anodes are subsequently permitted to cool slowly, whereby the copper in the structure is annealed and at the termination of the heating cycle is in a stress-relieved condition. At this point comparison of the dimensions of the unified anode with the dimensions of the anode assemblage after tack welding (i.e. immediately before placing in the brazing furnace) will disclose that no change in dimensions has occurred. This fact is important in precision manufacture since it permits a more uniform product to be made than was feasible under prior brazing methods.

While the invention has been described with reference to the bonding of copper laminae by interleaving the laminates with a layer of pure silver, the invention is not limited to those materials. For example, the laminae may be constituted by copper alloys, or by iron, steel, nickel, their alloys, and various other metallic materials having a bonding affinity for silver. In lieu of pure silver as the bonding component, gold may be employed. It should be noted, however, that the thermal expansion coefficient of gold is substantially lower than the expansion coefficient of silver. The material of which the welds are formed must have a lower rate of expansion than the bonding component and for this reason the usefulness of gold is limited since most of the common metals and metallic alloys have thermal expansion coefficients exceeding that of gold.

This invention is not limited to the particular details, materials and processes described, as many equivalents will suggest themselves to those skilled in the art. It is accordingly desired that the appended claims be given a broad interpretation commensurate with the scope of the invention within the art.

What is claimed is:

1. A method of bonding metallic laminae by brazing comprising the steps of forming laminae from material having a lower coefficient of thermal expansion than the bonding metal, plating the laminae with a coat of the bonding metal, assembling the laminae on a fixture, forcing together the coated surfaces to be bonded, joining the laminae by peripheral tack welds, removing the welded assembly of laminae from the fixture and heating the welded assembly to brazing temperature to cause bonding of the laminae.

2. A method of bonding metallic laminae comprising the steps of forming laminae from material having a bonding affinity for and a lower coefficient of thermal expansion than silver, assembling the laminae on a fixture with a thin layer of silver separating the surfaces to be bonded, forcing together the surfaces to be bonded, joining the laminae by peripheral tack welds, removing the tack welded assembly from the fixture and heating the tack welded assembly to brazing temperature to cause bonding of the laminae.

3. A method of bonding metallic laminae comprising the steps of forming laminae from material having a bonding affinity for and a lower coefficient of thermal expansion than silver, planting the laminae with a thin coat of silver, assembling the laminae on an aligning fixture, forcing the surfaces to be bonded into intimate contact, joining the laminae by peripheral tack welds, removing the tack welded assembly from the fixture and heating the tack welded assembly in an oxidizing-preventing atmosphere to elevated temperatures to cause bonding of the laminae.

4. A method of bonding aligned copper laminae comprising the steps of working copper laminae into final form, cleansing the laminae to remove grease and other contaminants, plating the laminae with a coat of silver, assembling the laminae on an alignment fixture, forcing the laminae into contact, joining the laminae by spaced peripheral welds, removing the welded assembly of laminae from the fixture and heating the welded assembly in an oxidizing-preventing atmosphere to brazing temperature to cause bonding of the laminae.

5. A method of bonding aligned metallic laminae comprising the steps of working metallic laminae into final form, cleansing the laminae to remove surface contaminants, plating the laminae with a bonding agent having a higher coefficient of thermal expansion than the laminae metal, assembling the laminae on an alignment fixture using spacers to separate the laminae into a plurality of assemblies, forcing said laminae into contact, joining the laminae of each assembly by peripheral tack welds, removing the welded assemblies from the alignment fixture, and heating the welded assemblies to elevated temperature to cause bonding of the laminae in each assembly.

References Cited in the file of this patent

UNITED STATES PATENTS

| | | |
|---|---|---|
| 1,365,291 | Stephens | Jan. 11, 1921 |
| 1,528,581 | Steenstrup | Mar. 3, 1925 |
| 2,154,273 | Kollsman | Apr. 11, 1939 |
| 2,187,431 | Powell | Jan. 16, 1940 |
| 2,332,360 | Wakefield | Oct. 19, 1943 |
| 2,341,752 | West | Feb. 15, 1944 |
| 2,385,388 | Thorensen | Sept. 25, 1945 |
| 2,398,449 | Ronci | Apr. 16, 1946 |
| 2,465,260 | Olson | Mar. 20, 1949 |
| 2,479,325 | De Domenico | Aug. 16, 1949 |
| 2,641,731 | Lines | June 9, 1953 |
| 2,713,196 | Brown | July 19, 1955 |
| 2,744,314 | Kinney | May 8, 1956 |
| 2,761,197 | Harbaugh | Sept. 4, 1956 |

UNITED STATES PATENT OFFICE
CERTIFICATE OF CORRECTION

Patent No. 2,992,480                 July 18, 1961

James H. Spencer

It is hereby certified that error appears in the above numbered patent requiring correction and that the said Letters Patent should read as corrected below.

Column 1, line 41, for "the" read -- a --; line 64, for "At" read -- A --; column 2, line 27, for "slidiably" read -- slidably --; line 66, for "assemblages" read -- assemblage --; column 3, line 60, for "laminates" read -- laminae --; column 4, line 29, for "planting" read -- plating --.

Signed and sealed this 16th day of January 1962.

(SEAL)
Attest:

ERNEST W. SWIDER               DAVID L. LADD
Attesting Officer                Commissioner of Patents